US012363470B2

(12) United States Patent
Kulavik et al.

(10) Patent No.: US 12,363,470 B2
(45) Date of Patent: Jul. 15, 2025

(54) EYEWEAR ACCOMMODATING HEADSET

(71) Applicant: Voyetra Turtle Beach, Inc., White Plains, NY (US)

(72) Inventors: Richard Kulavik, San Jose, CA (US); Andy Logan, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

(21) Appl. No.: 18/762,001

(22) Filed: Jul. 2, 2024

(65) Prior Publication Data

US 2024/0357272 A1 Oct. 24, 2024

Related U.S. Application Data

(63) Continuation of application No. 18/310,070, filed on May 1, 2023, now Pat. No. 12,081,931, which is a (Continued)

(51) Int. Cl.
*H04R 5/033* (2006.01)
*H04R 1/10* (2006.01)

(52) U.S. Cl.
CPC ......... *H04R 1/1008* (2013.01); *H04R 1/1091* (2013.01); *H04R 5/0335* (2013.01); (Continued)

(58) Field of Classification Search
CPC ................ H04R 1/1008; H04R 1/1041; G10K 2210/1081; A61F 11/14; A61F 2011/145
See application file for complete search history.

(56) References Cited

U.S. PATENT DOCUMENTS 4,170,275 A * 10/1979 Larsen ................. H04R 1/1008 181/129
4,572,324 A * 2/1986 Fidi ...................... H04R 1/1008 181/129

(Continued)

FOREIGN PATENT DOCUMENTS

CN 202261724 5/2012
CN 205883516 1/2017

(Continued)

OTHER PUBLICATIONS

International Search Report and Written Opinion for PCT/US2014/061105 dated Nov. 6, 2014.

(Continued)

*Primary Examiner* — Ryan Robinson
(74) *Attorney, Agent, or Firm* — McAndrews, Held & Malloy, Ltd.

(57) ABSTRACT

A headset may comprise at least one ear cup and an ear cup shaper configurable into at least two configurations. When the ear cup shaper is configured in a first of the configurations, the ear cup is shaped to contact the temple of a wearer of the headset. When the adjustable ear cup shaper is configured in a second of the configurations, the ear cup is shaped to accommodate the temple piece of a pair of eyeglasses of a wearer of the headset. The ear cup may comprise a filler material such as foam, and the adjustable ear cup shaper when configured in the second of the configurations may create a depression in the foam. The adjustable ear cup shaper may comprise a strap and/or a plunger.

20 Claims, 11 Drawing Sheets

Related U.S. Application Data continuation of application No. 17/725,603, filed on Apr. 21, 2022, now Pat. No. 11,683,628, which is a continuation of application No. 16/718,312, filed on Dec. 18, 2019, now Pat. No. 11,343,603, which is a continuation of application No. 16/548,293, filed on Aug. 22, 2019, now Pat. No. 10,555,065, which is a continuation of application No. 16/418,497, filed on May 21, 2019, now Pat. No. 10,469,930, which is a continuation of application No. 15/464,644, filed on Mar. 21, 2017, now Pat. No. 10,299,024, which is a continuation of application No. 14/726,667, filed on Jun. 1, 2015, now Pat. No. 9,602,905, which is a continuation of application No. 14/458,366, filed on Aug. 13, 2014, now Pat. No. 9,049,512.

(60) Provisional application No. 61/908,802, filed on Nov. 26, 2013.

(52) U.S. Cl.
CPC ............ *H04R 1/1058* (2013.01); *H04R 5/033* (2013.01); *H04R 2420/09* (2013.01)

(56) References Cited

U.S. PATENT DOCUMENTS

| | | | | | |
|---|---|---|---|---|---|
| 4,670,911 | A | * | 6/1987 | Dunford | A61F 11/06 2/209 |
| 5,706,360 | A | * | 1/1998 | Khandekar | H04R 1/1008 381/385 |
| 5,920,911 | A | * | 7/1999 | Cushman | A61F 11/14 181/129 |
| 5,924,138 | A | * | 7/1999 | Baisden | G02C 11/00 351/158 |
| 5,943,703 | A | * | 8/1999 | Avila, Jr. | A61F 11/14 351/122 |
| 6,434,250 | B1 | | 8/2002 | Tsuhako | |
| 8,605,935 | B1 | | 12/2013 | Huang | |
| 8,638,969 | B2 | * | 1/2014 | Kuhtz | H04R 1/1008 381/372 |
| 9,049,512 | B1 | | 6/2015 | Kulavik | |
| D776,082 | S | * | 1/2017 | Willman | D14/205 |
| 9,602,905 | B2 | | 3/2017 | Kulavik | |
| 10,299,024 | B2 | | 5/2019 | Kulavik | |
| 10,469,930 | B2 | | 11/2019 | Kulavik | |
| 10,555,065 | B2 | | 2/2020 | Kulavik | |
| 10,841,686 | B2 | * | 11/2020 | Brace | H04R 1/1008 |
| 11,343,603 | B2 | | 5/2022 | Kulavik | |
| 2007/0248238 | A1 | | 10/2007 | Abreu | |
| 2010/0119076 | A1 | | 5/2010 | Monk et al. | |
| 2011/0092935 | A1 | * | 4/2011 | Hann | A61F 13/47272 604/360 |
| 2014/0286520 | A1 | * | 9/2014 | Ogino | H04R 1/1091 381/371 |
| 2015/0078570 | A1 | | 3/2015 | Grone et al. | |
| 2016/0057524 | A1 | | 2/2016 | Kulavik et al. | |
| 2017/0094400 | A1 | * | 3/2017 | Willman | H04R 1/1008 |
| 2017/0257691 | A1 | * | 9/2017 | Kulavik | H04R 1/1008 |

FOREIGN PATENT DOCUMENTS

| | | | | | |
|---|---|---|---|---|---|
| DE | 2706382 | A | * | 8/1977 | A61F 11/14 |
| DE | 2708063 | A | * | 8/1977 | A61F 11/14 |
| DE | 202008016854 | | | 2/2010 | |
| DE | 102019115742 | B3 | * | 9/2019 | H04R 1/1008 |
| EP | 3188494 | | | 7/2017 | |
| JP | 2002101483 | | | 4/2002 | |
| JP | 2012244617 | | | 12/2012 | |
| KR | 200401420 | | | 11/2005 | |
| WO | 2013088689 | | | 6/2013 | |

OTHER PUBLICATIONS

PCT International Preliminary Report on Patentability dated Jun. 9, 2016 for PCT Application No. PCT/US2014/061105.

International Search Report and Written Opinion for PCT/US2018/42396 dated Sep. 4, 2018.

Int'l Search Report on Patentability Appln No. PCT/US2018/042396 dated Mar. 12, 2020 (12 pgs.).

Extended European Search Report Appln No. 18851274.3 dated Apr. 8, 2021.

Extended European Search Report Appln No. 14866528.4 dated May 31, 2017.

Chinese Office Action Appln No. 2019107033371 dated Mar. 12, 2020.

Chinese Office Action Appln No. 2018800662785 dated Oct. 27, 2021.

Chinese Office Action Appln No. 2018800662785 dated Apr. 21, 2022.

Chinese Office Action Appln No. 2018800662785 dated Jul. 20, 2022.

* cited by examiner

EYEWEAR ACCOMMODATING HEADSET

CLAIM OF PRIORITY

The present application is a continuation of U.S. patent application Ser. No. 18/310,070, filed May 1, 2023, which continuation of U.S. patent application Ser. No. 17/725,603, filed Apr. 21, 2022, now U.S. Pat. No. 11,683,628, which is a continuation of U.S. patent application Ser. No. 16/718,312, filed Dec. 18, 2019, now U.S. Pat. No. 11,343,603, which is a continuation of U.S. patent application Ser. No. 16/548,293, filed Aug. 22, 2019, now U.S. Pat. No. 10,555,065, which is a continuation of U.S. patent application Ser. No. 16/418,497, filed May 21, 2019, now U.S. Pat. No. 10,469,930, which is a continuation of U.S. patent application Ser. No. 15/464,644, filed Mar. 21, 2017, now U.S. Pat. No. 10,299,024, which is a continuation of U.S. patent application Ser. No. 14/726,667, filed Jun. 1, 2016, now U.S. Pat. No. 9,602,905, which is a continuation of U.S. patent application Ser. No. 14/458,366, now U.S. Pat. No. 9,049,512, filed on Aug. 13, 2014, which in turn claims the benefit of priority to U.S. Provisional Patent Application Ser. No. 61/908,802. Each of the above-referenced applications is hereby incorporated herein by reference in their entirety.

BACKGROUND

Limitations and disadvantages of conventional and traditional headsets become apparent to one of skill in the art, through comparison of such systems with some aspects of the present invention as set forth in the remainder of the present application with reference to the drawings.

BRIEF SUMMARY OF THE INVENTION

System and methods are provided for eyewear accommodating headset, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
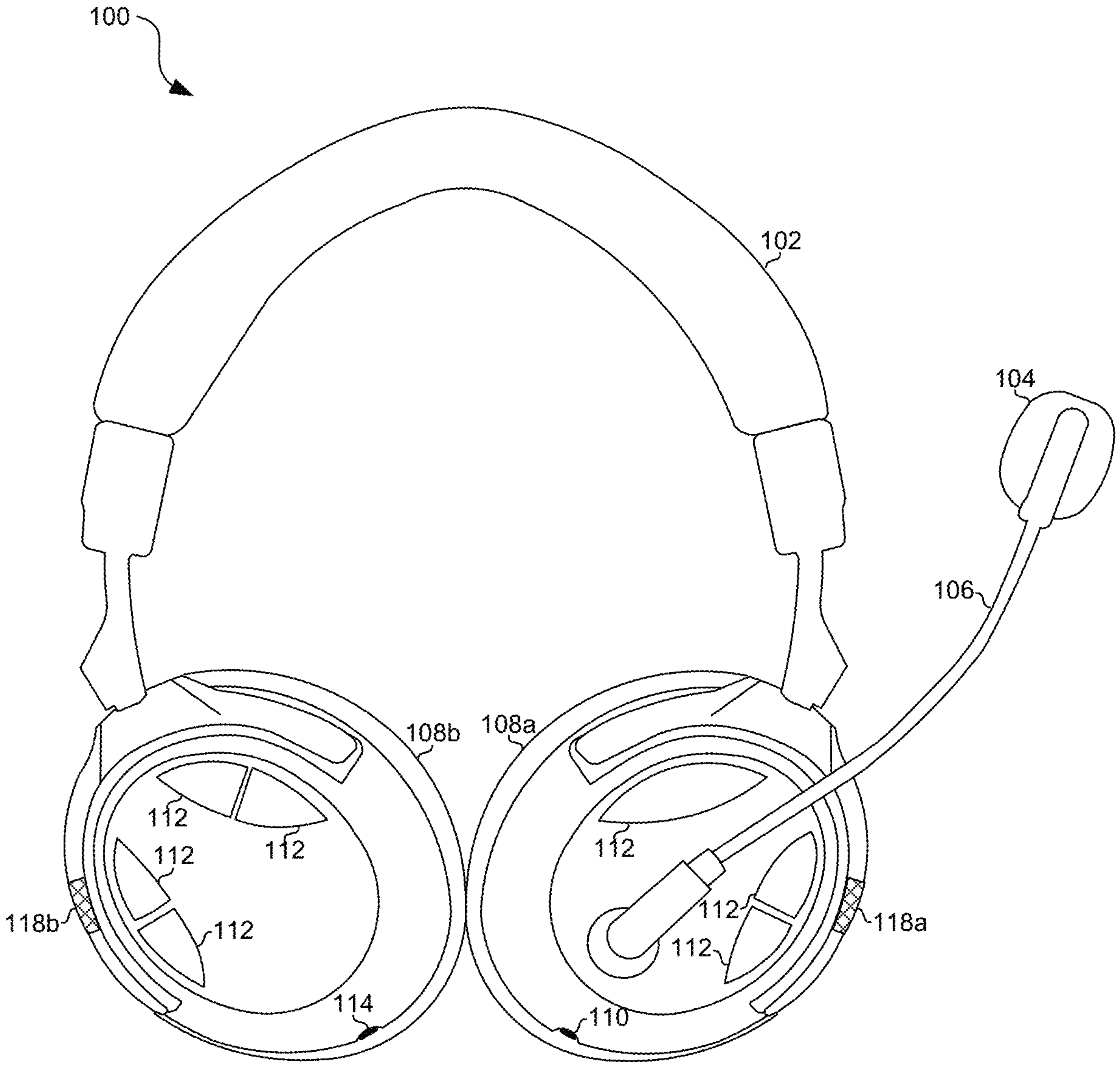
FIG. 1 depicts a first view of a headset configured for accommodating eyewear.
Figure 2:
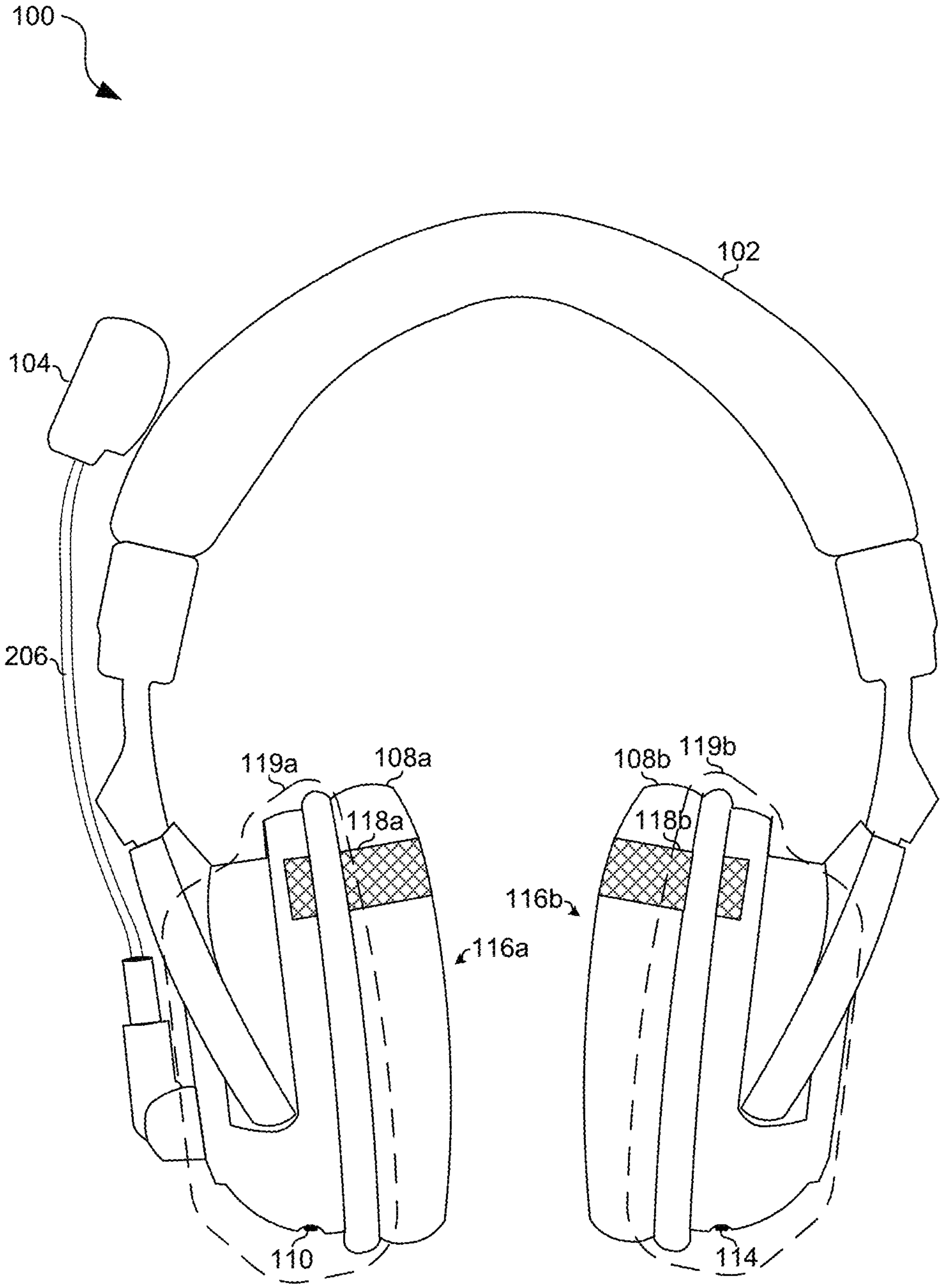
FIG. 2 depicts a second view of the headset of FIG. 1.

Referring to FIGS. 1 and 2, there is shown two views of an example headset 100 that may present audio received from a connected device (e.g., game console) to a listener. The headset 100 comprises a headband 102, a microphone boom 106 with microphone 104, ear cups 108*a* and 108*b* which attach to housings 119*a* and 119*b* which house speakers 116*a* and 116*b*, strap 118*a* and 118*b* for accommodating eyewear, connector 110, connector 114, and user controls 112.

The connector 110 may be, for example, a 3.5 mm headphone socket for receiving analog audio signals (e.g., receiving chat audio via an Xbox "talkback" cable).

The microphone 104 converts acoustic waves (e.g., the voice of the person wearing the headset) to electric signals for processing by circuitry of the headset and/or for output to a device (e.g., gaming console, a smartphone, and/or the like) that is in communication with the headset.

The speakers 116*a* and 116*b* convert electrical signals to soundwaves.

The user controls 112 may comprise dedicated and/or programmable buttons, switches, sliders, wheels, etc. for performing various functions. Example functions which the controls 112 may be configured to perform include: power the headset 100 on/off, mute/unmute the microphone 104, control gain/volume of, and/or effects applied to, chat audio by the audio processing circuitry of the headset 100, control gain/volume of, and/or effects applied to, game audio by the audio processing circuitry of the headset 100, enable/disable/initiate pairing (e.g., via Bluetooth, Wi-Fi direct, or the like) with another computing device, and/or the like.

The connector 114 may be, for example, a USB port. The connector 114 may be used for downloading data to the headset 100 from another computing device and/or uploading data from the headset 100 to another computing device. Such data may include, for example, parameter settings. Additionally, or alternatively, the connector 114 may be used for communicating with another computing device such as a smartphone, tablet compute, laptop computer, or the like.

Figure 6B:
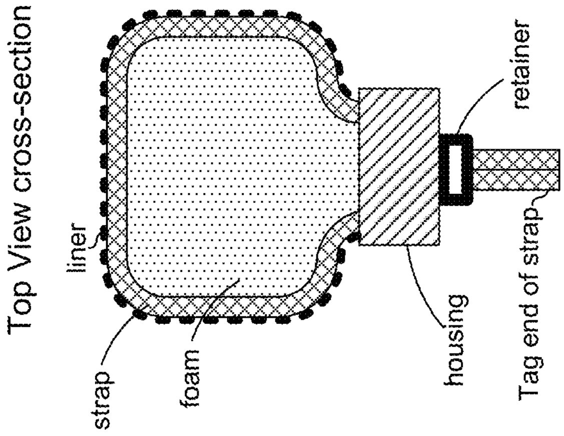
FIGS. 6A and 6B illustrate cross section views of the embodiment of the headset shown in FIG. 5B.
Figure 6A:
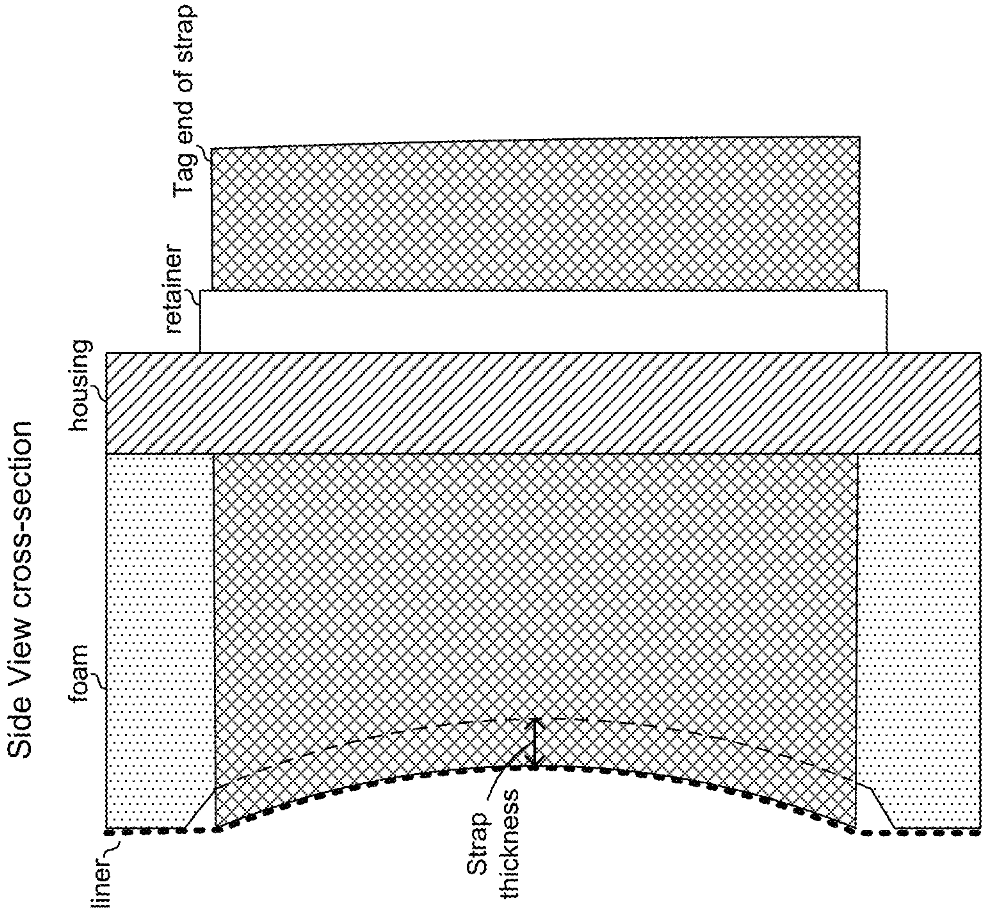

Each of the housings 119*a* and 119*b* may comprise rigid plastic and/or metal for providing shape and support of the headset 200. Each of the ear cups 108*a* and 108*b* is attached to a respective one of the housings 119*a* and 119*b*. As shown in FIGS. 6A and 6B, each of the housings 119*a* and 119*b* may provide a support structure which may be used in applying tension to a respective one of the straps 118*a* and 118*b*.

The ear cups 108*a* and 108*b* are configured for surrounding the wearer/listener's ears and compressing against the wearer/listener's head to create an enclosed acoustic environment for improved sound quality. As shown in FIGS. 6A and 6B, the ear cups 108*a* and 108*b* may comprise, for example, foam that compresses against the listeners head for creating the seal, an outer liner (e.g., a breathable fabric that wicks heat and/or moisture away from the listener's head), and an adjustable strap for deforming the foam to accommodate the temple pieces of a pair of eyeglasses worn by the wearer/listener.

Figure 3:
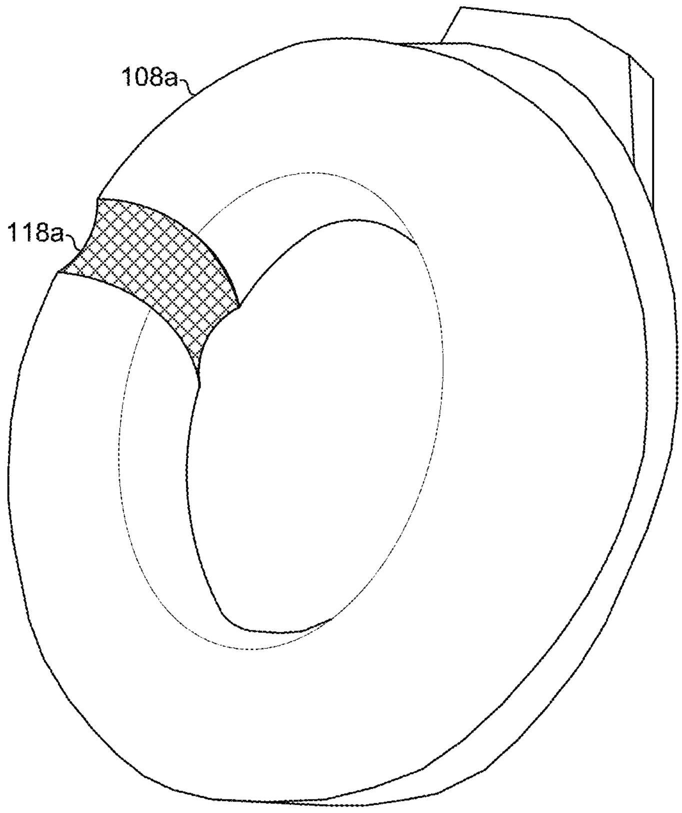
FIG. 3 depicts one of the ear cups of the headset of FIG. 1

FIG. 3 depicts one of the ear cups of the headset of FIG. 1. In FIG. 3, the foam and lining of ear cup 108*a* is deformed, creating space for the temple piece of a pair of eyeglasses, as a result of tension applied to the strap 118*a*.

Figure 4B:
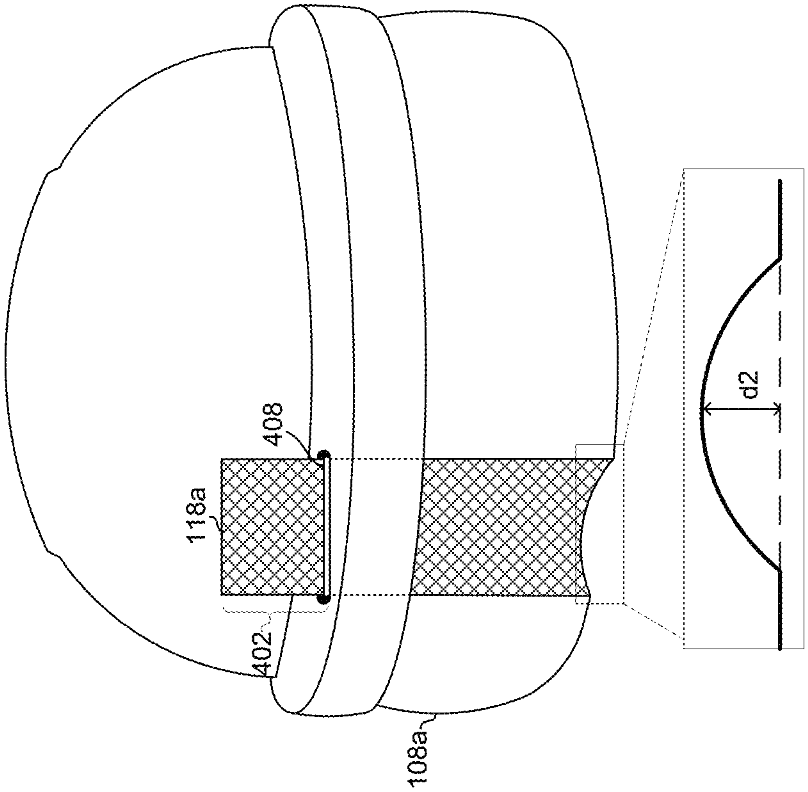
FIGS. 4A and 4B illustrate adjusting the tightness of the strap of a first embodiment of the headset to adjust the amount of space created for the eyewear.
Figure 4A:
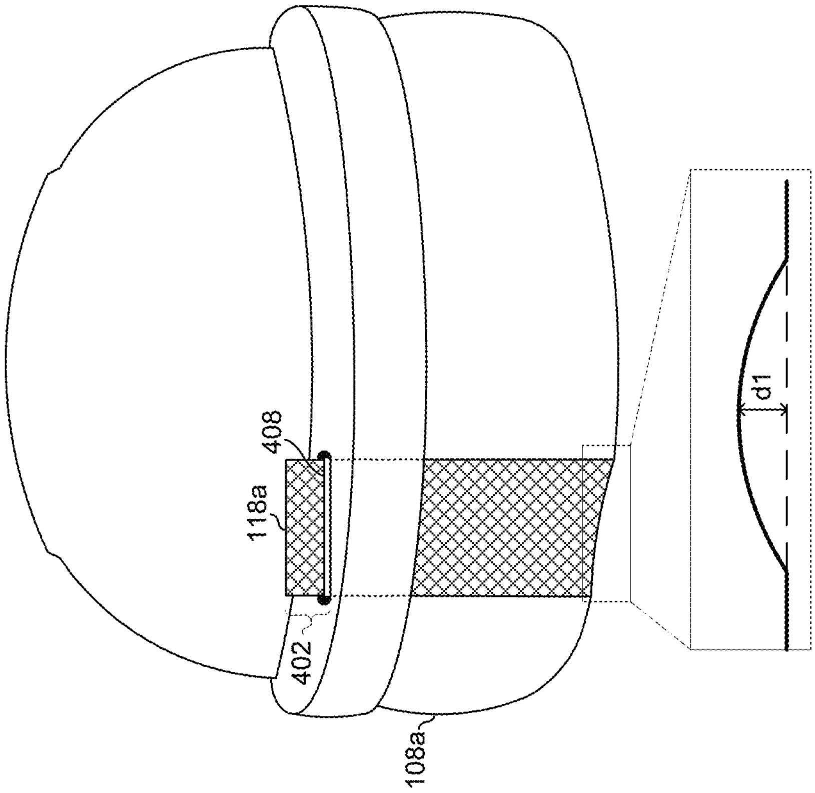
Figure 5B:
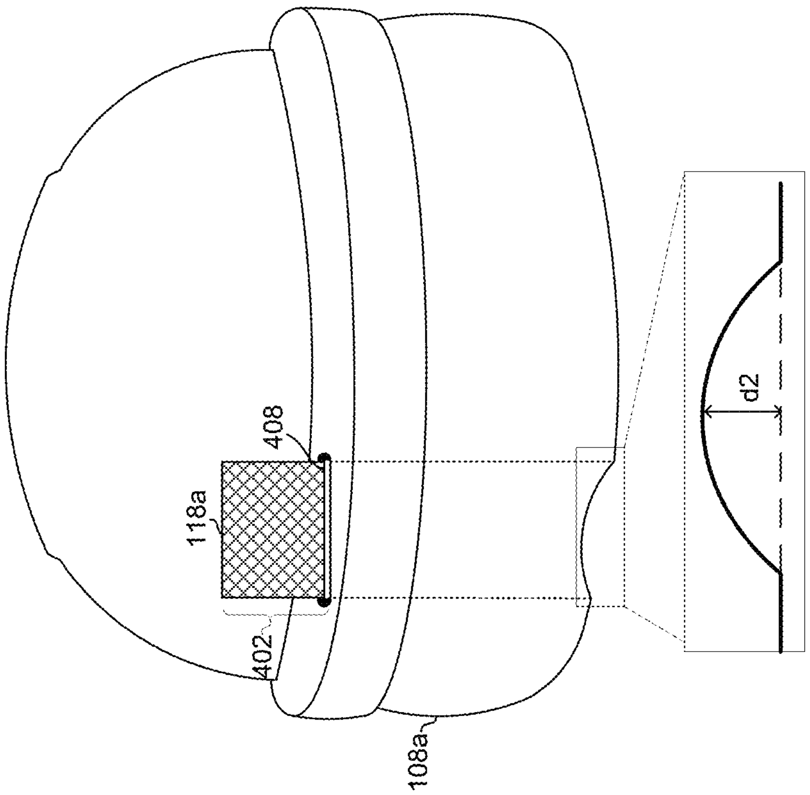
FIGS. 5A and 5B illustrate adjusting the tightness of the strap of a second embodiment of the headset to adjust the amount of space created for the eyewear.
Figure 5A:
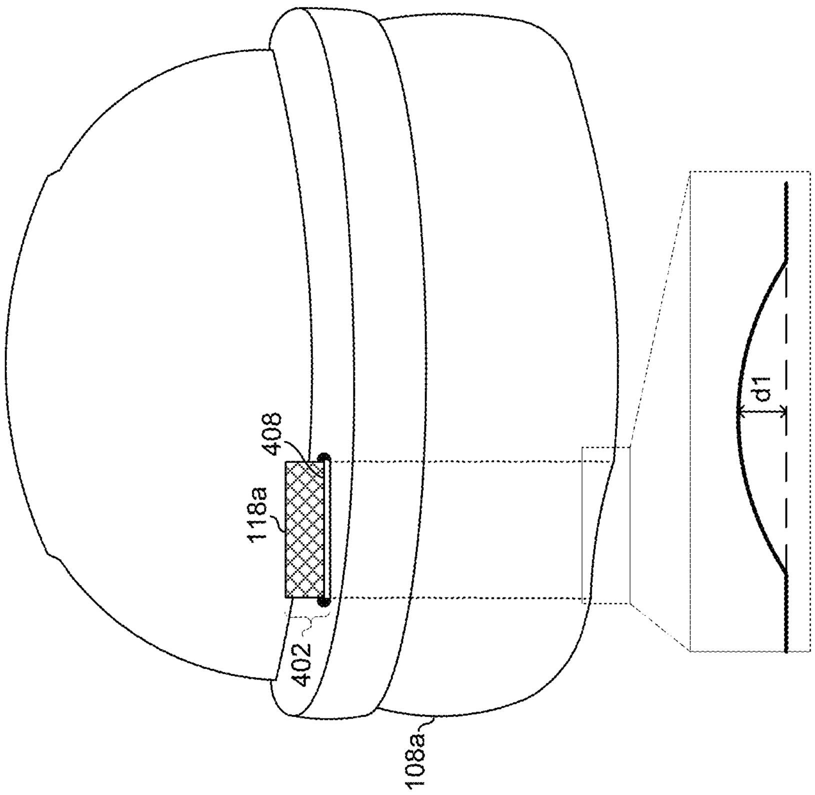

In the embodiment of FIGS. 4A and 4B, the strap is on the outside of the ear cup lining. This may be the case, for example, where the straps are sold as an after-market add-on. In the embodiment of FIGS. 5A and 5B, the strap is on the inside of the ear cup lining (e.g., stitched to the inside of the lining), as indicated by the dashed lines. The wearer/listener may adjust the tension of the strap 118*a* by pulling on the tag end (e.g., directly or via a ratchet, dial, or other mechanical assembly). In FIGS. 4A and 5A there is less tension on the strap 118*a* relative to the tension on the strap in FIGS. 4B and 5B. Consequently, in FIGS. 4A and 5A there is a shorter tag end 402 and an accompanying smaller deformation, d1, in the ear cup as compared to the longer tag end and larger deformation d2 in FIGS. 4B and 5B. The tension may be maintained by a retaining device 408 which grips the strap 118*a* and braces against the housing 119*a*, as shown in FIGS. 6A and 6B. In an example embodiment, the strap tension may be fixed and the retaining device 408 may simply be a stitching together of two ends of the strap. In another example embodiment, the retaining device may be such as is found on a clothing belt. In another example embodiment, the retaining device may be buttons, or Velcro, or the like. In another example embodiment, the retaining device may use a ratcheting action such as is used on snow sports boots and/or bindings.

Figure 7:
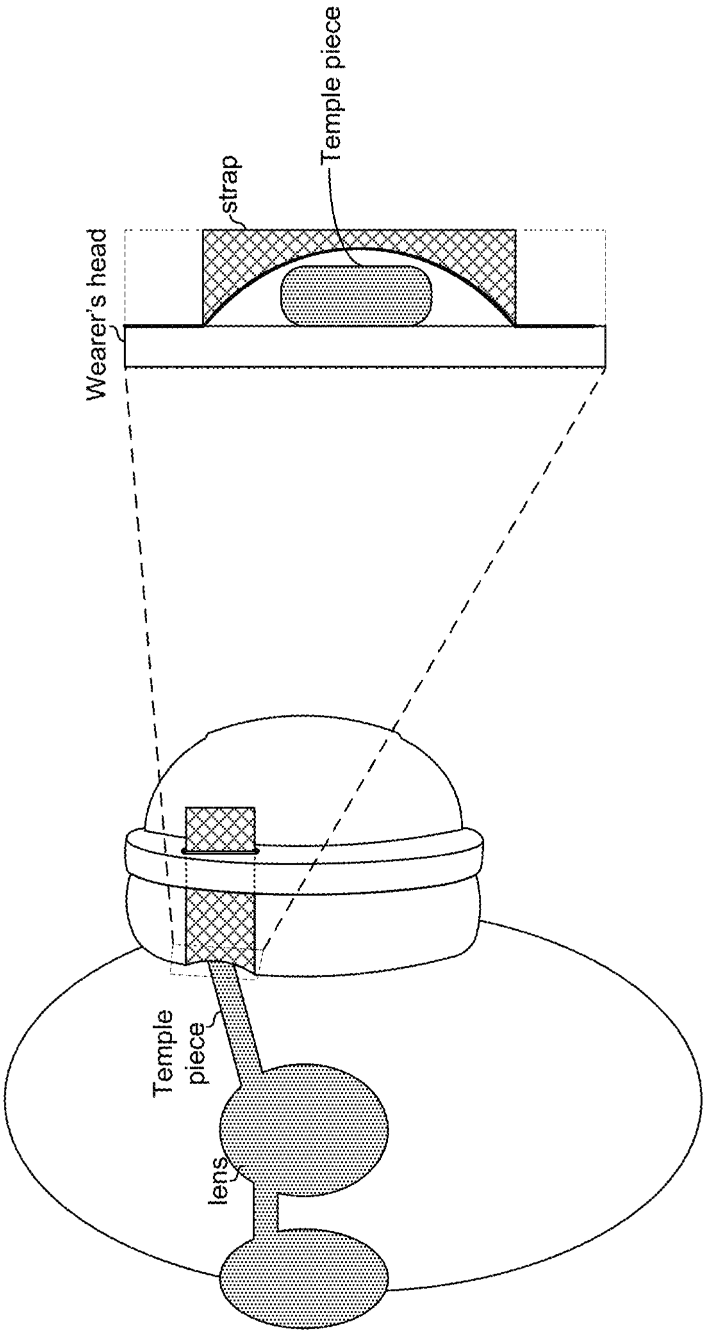
FIG. 7 illustrates how the temple piece of the glasses fits into the depression created by the strap.

FIG. 7 illustrates how the temple piece of the glasses fits into the depression created by the strap. As can be seen from the figure a larger depression (e.g., d2 of FIG. 4B) may be desired for a bigger temple piece (e.g., thick plastic frames) whereas a smaller depression (e.g., dl of FIG. 4A) may be desired for a smaller temple piece (e.g., for thin wire frames).

Figure 8:
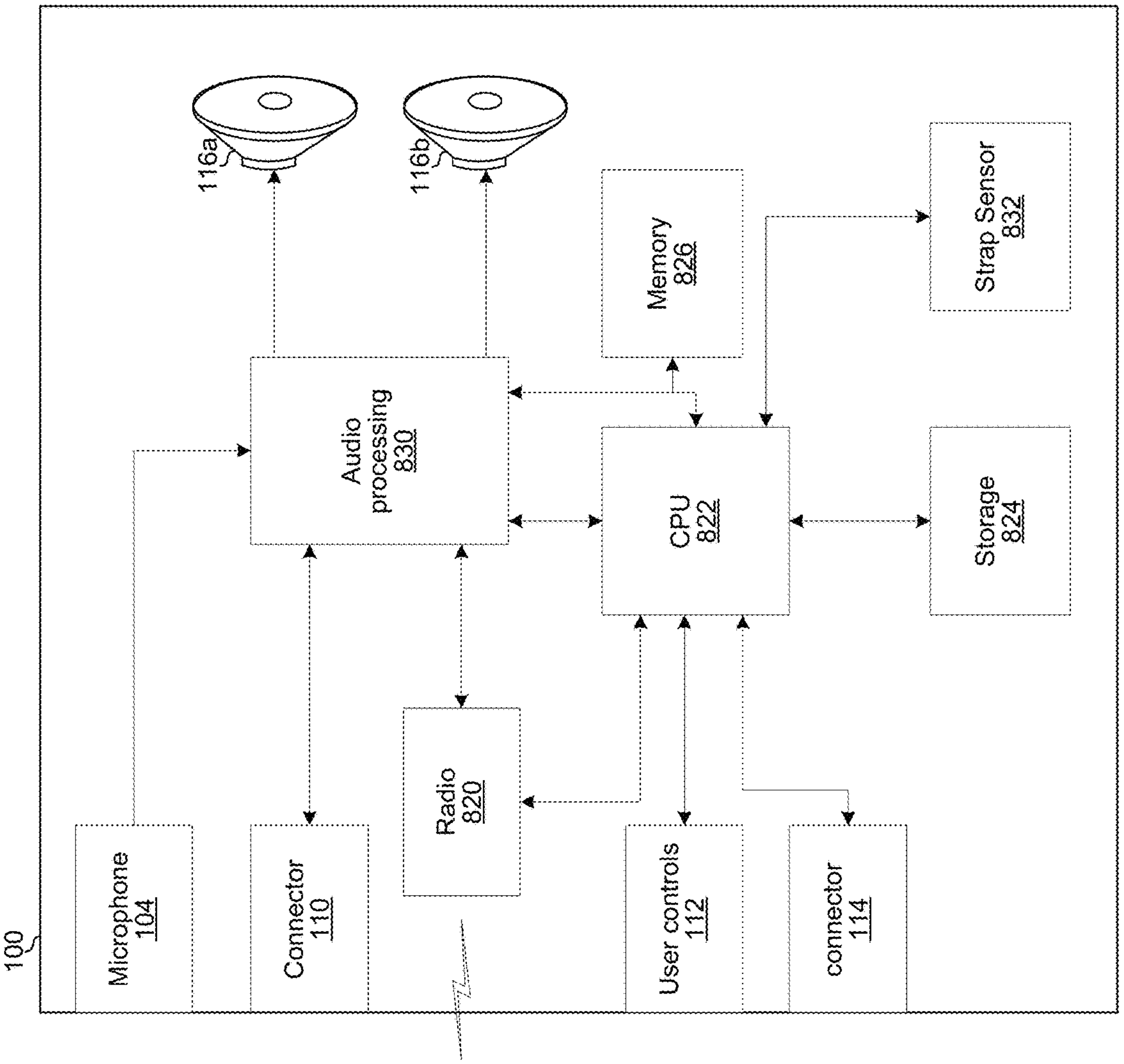
FIG. 8 depicts a block diagram of an example implementation of a headset with eyewear accommodation.

FIG. 8 depicts a block diagram of an example implementation of a headset with eyewear accommodation. In addition to the connector 110, user controls 112, connector 114, microphone 104, and speakers 116*a* and 116*b* already discussed, shown are a radio 820, a CPU 822, a storage device 824, a memory 826, an audio processing circuit 830, and a strap sensor 832.

The radio 820 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 300).

The CPU 822 comprises circuitry operable to execute instructions for controlling/coordinating the overall operation of the headset 100. Such instructions may be part of an operating system or state machine of the headset 100 and/or part of one or more software applications running on the headset 100. In some implementations, the CPU 822 may be, for example, a programmable interrupt controller, a state machine, or the like.

The storage device 824 comprises, for example, FLASH or other nonvolatile memory for storing data which may be used by the CPU 822 and/or the audio processing circuitry 830. Such data may include, for example, parameter settings that affect processing of audio signals in the headset 100 and parameter settings that affect functions performed by the user controls 112. For example, one or more parameter settings may determine, at least in part, a gain of one or more gain elements of the audio processing circuitry 830. As another example, one or more parameter settings may determine, at least in part, a frequency response of one or more filters that operate on audio signals in the audio processing circuitry 830. As another example, one or more parameter settings may determine, at least in part, whether and which sound effects are added to audio signals in the audio processing circuitry 830 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 100 in accordance with one or more algorithms, based on user input (e.g., via controls 112), and/or based on input received via one or more of the connectors 110 and 114.

The memory 826 comprises volatile memory used by the CPU 822 and/or audio processing circuit 830 as program memory, for storing runtime data, etc.

The strap sensor 832 comprises circuitry operable to detect the position of one or both of the straps 118*a* and 118*b*, tension on one or both of the straps 118*a* and 118*b*, amount of deformation in the foam as a result of one or both of the straps 118*a* and 118*b*, and/or a size of an air-gap between one or both of the ear cups 108*a* and 108*b* and the wearer's head as a result of the straps 118*a* and/or 118*b*. The sensor may comprise, for example, a magnet with hall sensor for each strap. The measurement(s) from the sensor 832 may be fed to the CPU 822 and/or audio processing circuitry 830 and processing of audio may be adjusted based on the measurements. For example, phase, amplitude, frequency, and/or some other characteristics of audio signals being output to the speakers 116*a* and 116*b* may be adjusted to compensate for the acoustic environment corresponding to the current measurement(s) (e.g., to account for an air gap between the headset and the wearer's head created by a strap 118*a* with a lot of tension on it). For example, based on whether the straps 118*a* and 118*b* are tight or loose a DSP tuning correction factor may be enabled or disabled. In an example implementation, the position of the strap may be used for identifying a wearer of the headset (e.g., where two siblings share the headset but only one of them wears glasses, which may be stored in user profile/settings).

The audio processing circuit 830 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 830 may be determined, at least in part, by one or more measurements from the sensor 832. The processing may be performed on game, chat, and/or microphone audio that is subsequently output to speaker 116*a* and 116*b*. Additionally, or alternatively, the processing may be performed on chat audio that is subsequently output to the connector 110 and/or radio 820.

FIGS. 9A-D depict an example implementation where retractable rigid structures positioned inside filler material of the ear cups (e.g., foam) enable the headset to comfortably accommodate temple pieces of eyeglasses.

Figures 9A, 9B, 9C, 9D:
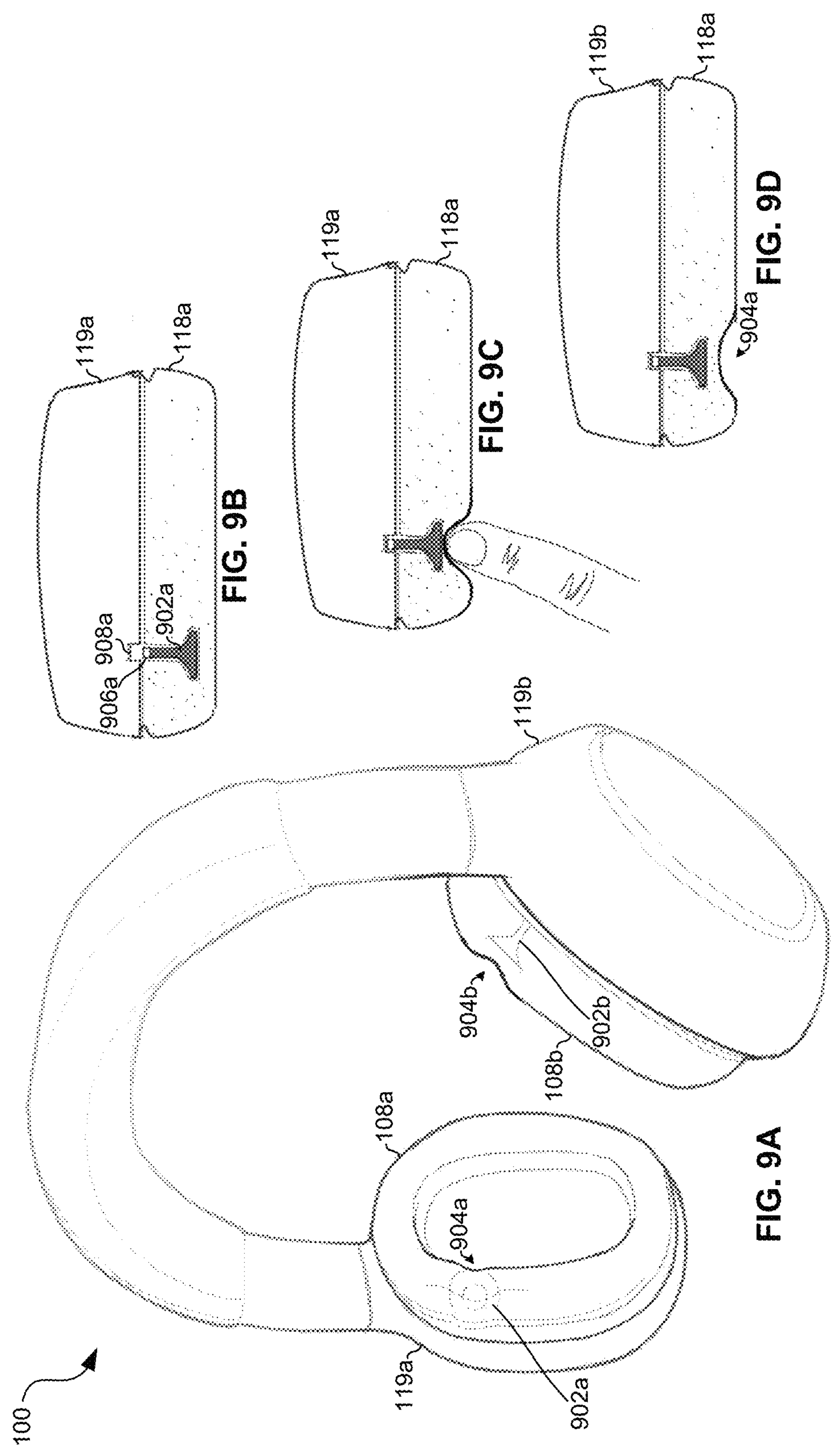
FIGS. 9A-D depict an example implementation where retractable structures positioned inside the foam of the ear cups enable the headset to accommodate temple pieces of eyeglasses.

FIG. 9A shows the entire headset 100 with depressions 904*a* and 904*b* in ear cups 108*a* and 108*b*, respectively, created by plunger 902*a* and 902*b*, respectively, which are within the ear cups 108*a* and 108*b*. As shown in FIG. 9B, when the plunger 902*a* is in an extended position such that deformation 904*a* is not present. FIG. 9C shows a user retracting the plunger 902*a* by pressing on it. FIG. 9D shows the structure in a retracted position such that deformation 904*a* is present to accommodate the temple piece of a pair of eyeglasses.

In an example implementation, the components 906*a* and 908*a* comprise a magnet 906*a* and a magnetic contact 908*a* such that the plunger 902*a* is held in a retracted position by magnetic force. In such an embodiment, the plunger 902*a* may be returned to the extended position by squeezing the ear cup 108*a* to exert an extension force that overcomes the magnetic force. In another example implementation, the components 906*a* and 908*a* may comprise a mechanical latch as is found in retractable ballpoint pens. In such an implementation a first push of the plunger 902*a* compresses the foam and engages the mechanical latch, and a second push of the plunger compresses the foam beyond the retracted position and disengages the mechanical latch allowing the foam to decompress (possibly aided by a spring) and return the plunger to the extended position.

Figure 10A:
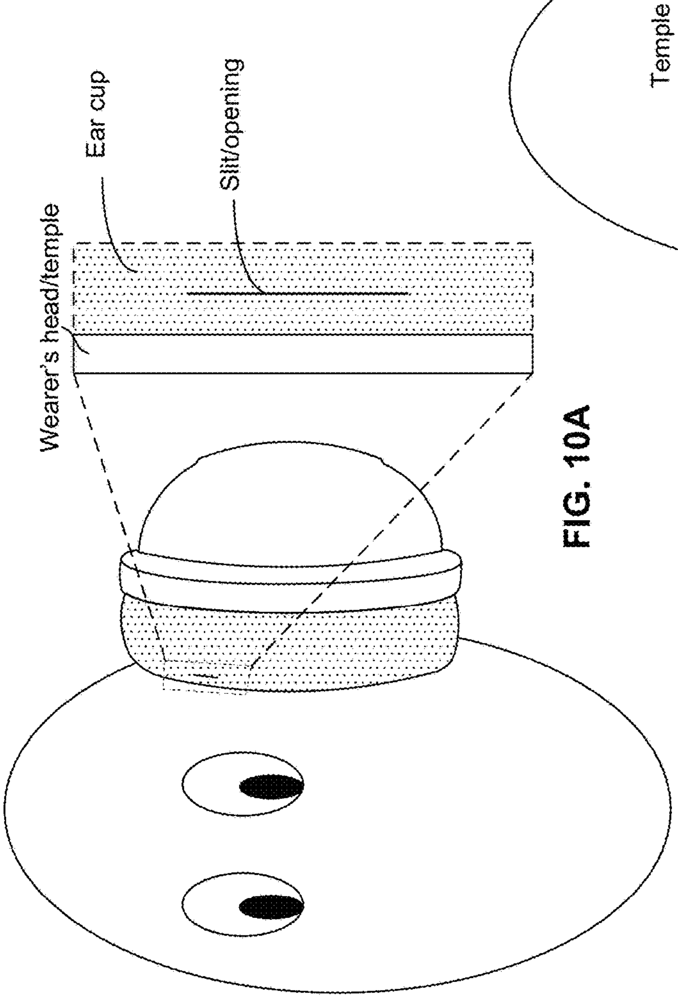
FIGS. 10A-D depict an example implementation in which the ear pieces have openings to accommodate temple pieces of eyeglasses.
Figure 10B:
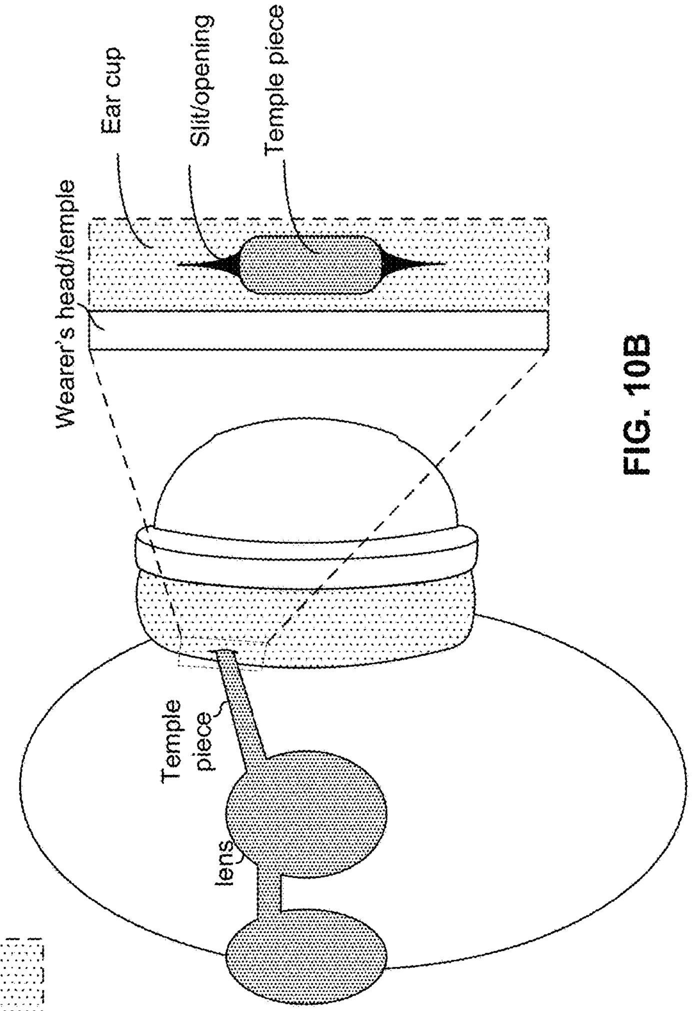
Figure 10C:
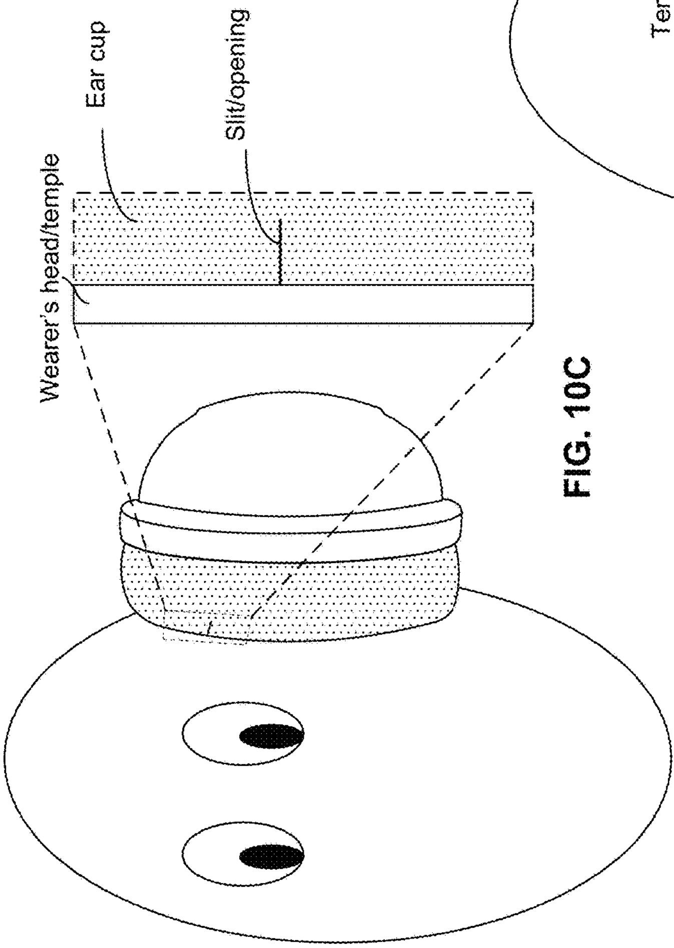
Figure 10D:
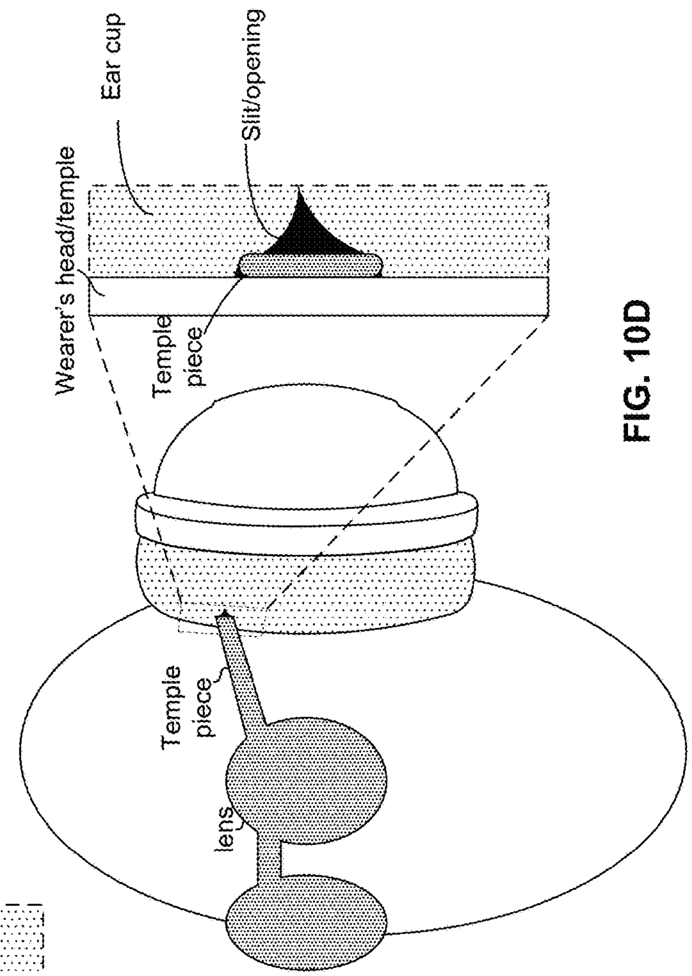

FIGS. 10A-D depict an example implementation in which the ear pieces have openings (e.g., slits) to accommodate temple pieces of eyeglasses. The slits/openings may be such that, when no glasses are being worn by a wearer of the headset, as shown in FIGS. 10A and 10C, the elastic nature of the filler material of the ear cups (e.g., foam) closes the slits/openings. On the other hand, when glasses are worn as shown in FIGS. 10B and 10D, the filler material is pushed aside by the temple piece of the eyeglasses while creating little or no additional pressure on the temples of the wearer as compared to when the headset is worn without the eyeglasses. In FIGS. 10A and 10B the slits are such that, when eyeglasses are being worn concurrently with the headset, the foam of the headset is between temple pieces of the eyeglasses and the temple of the wearer. In FIGS. 10C and 10D, the filler material (e.g., foam) is pushed out of the way such that the temple pieces contact the temples of the wearer. Ideally, in the embodiments of FIGS. 10A-10D, the filler material is compressed mostly in the vertical direction such that any additional pressure resulting from the presence of the temple pieces (relative to when the headset is worn without the eyeglasses) is exerted in the vertical directions on the temple pieces, rather than in the horizontal direction on the temples of the wearer. To this end, there may be, for example, hollow areas in the foam adjacent to the slits for receiving the foam that is pushed out of the way by the temple pieces.

In accordance with an example implementation of this disclosure, a headset (e.g., 100) may comprise at least one ear cup (e.g., 108*a*) and an ear cup shaper configurable into at least two configurations. When the ear cup shaper is configured in a first of the configurations, the ear cup is shaped to contact the temple of a wearer of the headset (e.g., as shown in FIGS. 2 and 9B). When the adjustable ear cup shaper is configured in a second of the configurations, the ear cup is shaped to accommodate the temple piece of a pair of eyeglasses of a wearer of the headset (e.g., as shown in FIG. 7). The ear cup may comprise a filler material such as foam, and the adjustable ear cup shaper when configured in the second of the configurations may create a depression (e.g., 904*a*) in the foam. The adjustable ear cup shaper may comprise a strap (e.g., 118*a*). A tag end of the strap (e.g., 402) may protrude from the ear cup to enable adjustment of the strap among the first of the configurations and the second of the configurations. The first of the configurations may correspond to a first, lesser amount of tension on the strap, and the second of the configurations may corresponds to a second, greater amount of tension on the strap. The adjustable ear cup shaper may comprises a retainer (e.g., 408) configured to maintain a desired amount of tension on the strap. The adjustable ear cup shaper may comprise a plunger (e.g., 902*a*). The adjustable ear cup shaper may comprise a magnet (e.g., 906*a*) and may be held in the second of the configurations by a magnetic force of the magnet. The adjustable ear cup shaper comprises a mechanical latch (e.g., comprising 906*a* and 908*a*) that, when engaged with the plunger, holds the plunger in the second of the positions.

The present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:

an ear cup for a headset, wherein:

the ear cup comprises a foam ring that comprises a hollow area that extends between a perimeter of the foam ring and a center space defined by the foam ring, and the hollow area is operable to receive foam when eyewear is worn by a user of the headset.

2. The system of claim 1, wherein the system comprises the headset.

3. The system of claim 1, wherein the foam ring is oval.

4. The system of claim 1, wherein the ear cup comprises a cooling layer that reduces heat build-up.

5. The system of claim 1, wherein the ear cup comprises a lining over the foam ring that provides heat transfer.

6. The system of claim 1, wherein the ear cup comprises a layer of material that wicks moisture away from the user of the headset.

7. The system of claim 1, wherein the hollow area is hidden below a top surface the foam ring.

8. The system of claim 1, wherein the hollow area is indented to accommodate eyewear worn by the user.

9. The system of claim 8, wherein when the eyewear is worn by the user, a depression is formed in the foam ring and foam is pushed.

10. The system of claim 1, wherein the ear cup is configured to contact a temple of the user when eyewear is not worn.

11. A system, the system comprising:

two ear cups for a headset, wherein:

each ear cup comprises a foam ring, each foam ring comprises a hollow area that extends between a perimeter of the corresponding foam ring and a center space defined by the corresponding foam ring, and the hollow area is operable to receive foam, of the corresponding foam ring, when eyewear is worn by a user of the headset.

12. The headset of claim 11, wherein the system comprises the headset.

13. The headset of claim 11, wherein each foam ring is oval.

14. The headset of claim 11, wherein each ear cup comprises a cooling layer that reduces heat build-up.

15. The headset of claim 11, wherein each ear cup comprises a lining over the foam ring that provides heat transfer.

16. The headset of claim 11, wherein each ear cup comprises a layer of material that wicks moisture away from the user of the headset.

17. The headset of claim 11, wherein each hollow area is hidden below a top surface the corresponding foam ring.

18. The headset of claim 11, wherein each hollow area is indented to accommodate eyewear worn by the user.

19. The system of claim 11, wherein when eyewear is worn by the user, a depression is formed in each foam ring and foam, of each foam ring, is pushed.

20. The headset of claim 11, wherein each ear cup is configured to contact a temple of the user when eyewear is not worn.

* * * * *